May 18, 1937.  P. S. TURNER  2,081,024
DETACHABLE AND REVERSIBLE RUNNER FOR THE WHEELS OF A CHILD'S VEHICLE
Filed March 9, 1936
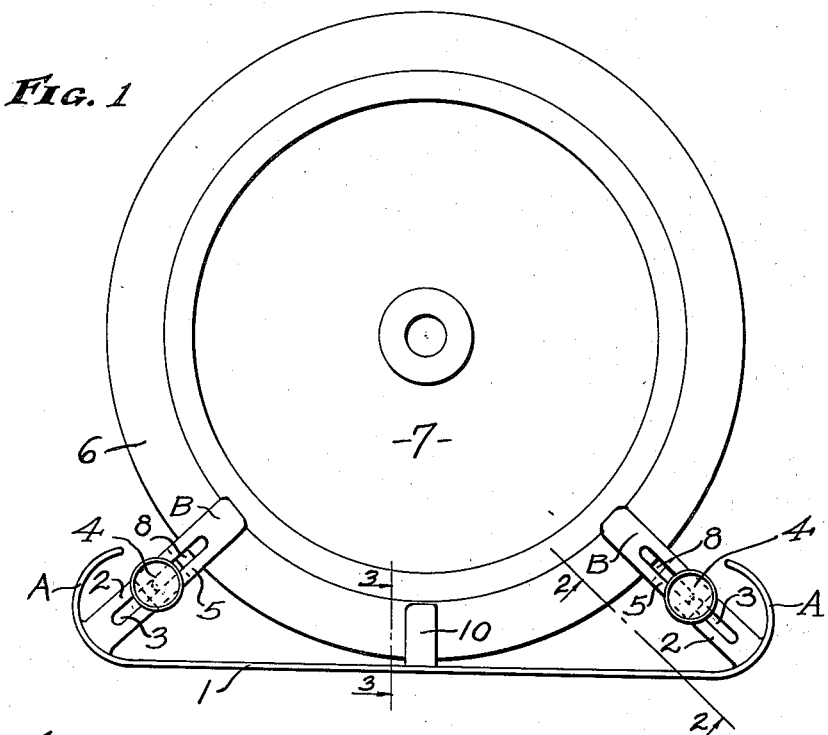
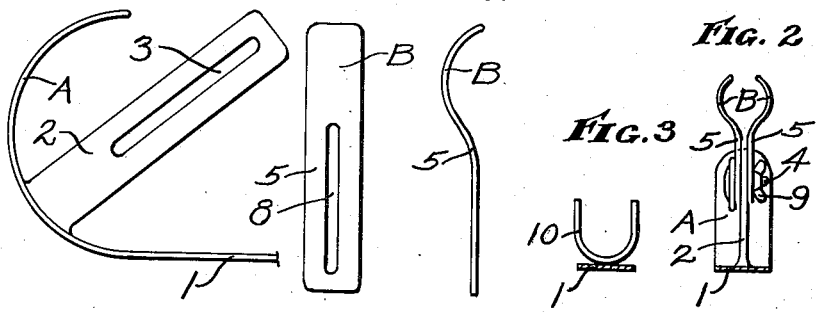
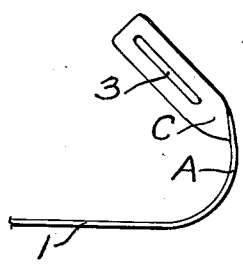
INVENTOR.
PAUL S. TURNER
BY
ATTORNEY.

Patented May 18, 1937

2,081,024

UNITED STATES PATENT OFFICE 2,081,024

DETACHABLE AND REVERSIBLE RUNNER FOR THE WHEELS OF A CHILD'S VEHICLE

Paul S. Turner, Wichita, Kans.

Application March 9, 1936, Serial No. 67,874

2 Claims. (Cl. 280—13)

My invention relates to a detachable and reversible runner for the wheels of a child's vehicle.

The object of my invention is to provide a runner that the up turned portion of each end are alike and reversible to avoid irregular appearance as to which side is placed outward with respect to the vehicle body.

A further object of my invention is to provide a clamp for each end of the runner that has adjustment for wheels varying in diameter, and means secured to the center of the runner in which the wheel will seat to avoid transverse movement of the runner.

A still further object of my invention is to provide a runner that does not require a connecting link for the ends of the runner aside from the wheel to avoid spreading or separating of the up turned portions of the runner, therefore the runner is light and inexpensive to construct.

These and other objects will hereinafter be more fully explained, reference being had to the accompanying drawing forming a part of this specification, and in which like characters will apply to like parts in the different views.

Referring to the drawing:

Fig. 1 is a side view of the runner and wheel to which it is applied.

Fig. 2 is a sectional view taken on line 2—2 in Fig. 1, the wheel being removed.

Fig. 3 is a sectional view thru the runner taken on line 3—3 in Fig. 1.

Fig. 4 is an enlarged view of one jaw of the clamps.

Fig. 5 is a side view of Fig. 4.

Fig. 6 is an enlarged side view of one end of the runner.

Fig. 7 shows a modification of construction for the up turned portion of the runner's ends.

Fig. 8 is an end view of Fig. 7, the jaws spaced from each side of the up turned portion of the runner, the bolt not shown.

My invention herein disclosed consists of a runner preferably made of a comparatively thin band of steel in form comprising a straight portion 1, both ends of which are curved upward and inward toward each other as shown at A in Fig. 1. Secured to the inside of each curved portion is a bar 2 obliquely slanting toward each other, each of which has an elongated slot 3 positioned in parallelism with the edges thereof and in which will engage a bolt 4 as binding means for jaws 5 to the said bar. There is one of said jaws on each side of the bar when positioned to engagement with the rim or tire 6 of a wheel 7 as shown in Fig. 1. Each jaw member has an elongated slot 8 in the straight portion thereof thru which the said bolt will engage, the arrangement of which is to accommodate wheels varying in diameter by sliding the said jaws longitudinally of the bar, or rock the same on the pivot point of the bolt prior to tightening the same thru the medium of a wing nut 9 threadedly engaging on the threaded shaft of the bolt, at which time the arcuate portion B of the jaws are brought to snug engagement with the tire of the wheel.

The said arcuate portions may be varied in form to coincide with a rim of different shape with respect to cross section.

Secured at the longitudinal center and upper side of the said runner is a U shaped clip 10, the legs of which extend upward to receive the rim or tire of a wheel seated therebetween functioning as a means to prevent side movement of the runner or displacement of the wheel at the instant of a side thrust when the vehicle is being conveyed as a sled.

In Figs. 8 and 9 is shown a modification for the terminal end of the curved portion of the runner that is twisted to a right angled position as at C, and being slotted as described for bar 2. This arrangement will economize the expense of manufacture. In either arrangement the jaws will function the same.

The runner so constructed is reversible, interchangeable and easily attached or removed from the wheel and valuable as an accessory for short intervals of snow duration.

The length of the runner may be varied, and such other modifications may be employed as lie within the scope of the appended claims, and having fully described my invention, what I claim as new and desire to secure by Letters Patent is:—

1. In a detachable, reversible runner for the wheels of a child's vehicle of the class described consisting of a straight portion of thin metal rectangular in cross section and of a preferred length, then curving a portion of each end thereof alike toward each other, a slotted bar having one end secured to the inner side of the curved portion adjacent the points where it joins the straight portion, to slant said bars obliquely toward each other and positioning the same radially of a wheel when placed on the runner, a pair of jaws adjustably carried on each of said bars, and means to secure the jaws rigidly to the bars respectively and to the tire of the wheel, a U shaped clip secured to the upper side of the straight portion of the runner to receive the tire of a wheel when the runner is placed thereon.

2. In a detachable and reversible runner for the wheels of a child's vehicle, a runner of the class described comprising a straight portion rectangular in cross section, each end of the runner having a curved portion upward and inward toward each other, the straight portion having a U shaped clip medially positioned to receive the tire of a wheel, a slotted bar having one end secured to the inside of each curved portion of the runner adjacent the point where the straight portion joins the curve, a pair of jaw members for each of said bars, each of said jaw members having a straight slotted portion to register with the slot in the bars respectively, the other portion arcuate in form to engage on the sides of the tire, the jaw members of each pair to oppositely engage on their respective slotted bars, and a wing nut to secure the same together simultaneously with the arcuate portion to the tire of a wheel, all substantially as shown.

PAUL S. TURNER.